April 17, 1956  J. L. HALL  2,741,856
TREATMENT OF FABRICS
Filed Sept. 24, 1953

INVENTOR
JOHN L. HALL
BY *H. Yates Dowell*
ATTORNEY

United States Patent Office 2,741,856
Patented Apr. 17, 1956

2,741,856

TREATMENT OF FABRICS

John L. Hall, Tyler, Tex.

Application September 24, 1953, Serial No. 382,127

1 Claim. (Cl. 34—44)

This invention relates to the drying and treatment of fabrics and more particularly to a clothes drier in which the clothes are tumbled as a heated ozonized air current is passed through them in order to dry, freshen and sterilize the clothes.

Clothes that are dried in a receptacle through the use of heated air have heretofore lacked the freshness of those dried out-of-doors. This has been due in part to the retention of organic and inorganic substances that imparted a pungent odor to the clothes.

Heretofore, the use of ultra-violet lamps in connection with indoor drying has been attempted but the results have continued to be substantially inferior to conventional outdoor drying where abundant quantities of fresh air and sunshine are available to dry and freshen the clothing through bleaching, ozonizing and sterilizing action.

According to my invention the undesirable characteristics of indoor drying are overcome through the use of a drier in which the air is controlled as to temperature, in which fresh make-up air is provided, and in which the air is ozonized substantially, the ozonization imparting the fresh clean characteristic odor of outdoor drying through the removal or oxidation of various substances which are not removed with conventional driers.

Accordingly, it is an object of the present invention to provide a clothes drier including air treatment means adapted to impart characteristics to the air such that it may dry the clothing and remove undesirable substances therefrom which accompany washing.

A further object is to provide a clothes drier including an air circuit in which the air is propelled through heating and ozonizing apparatus in order to condition it for drying and sterilizing the clothing.

A further object is to provide a fabric treatment device in which the fabric is completely and continuously exposed to a conditioned current of heated make-up air, in which the air has imparted to it substantial quantities of ozone, and including automatic means for controlling the air moving, heating, ozonizing and clothes movement elements.

Figure 1:
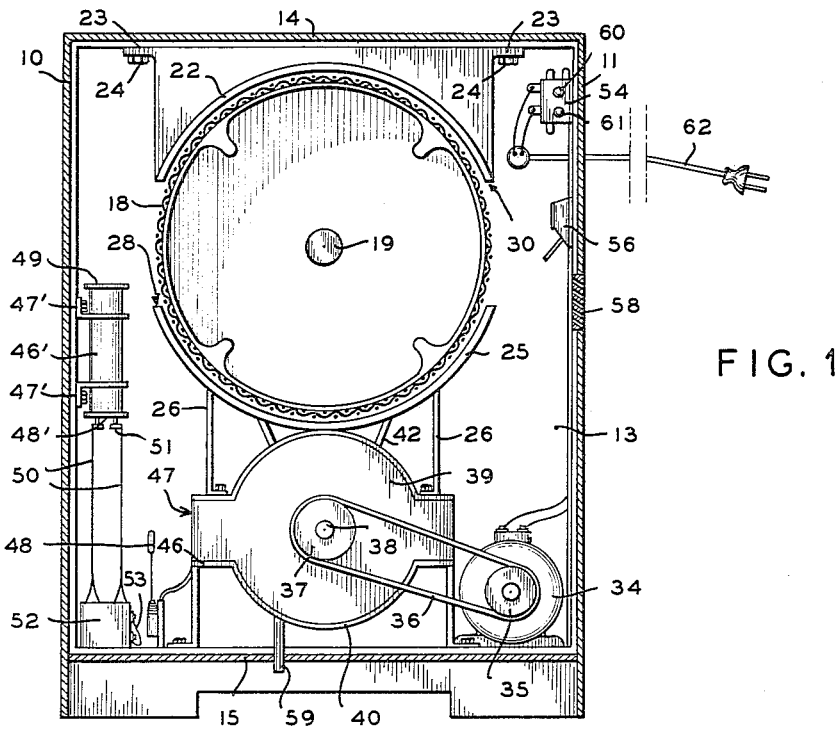
Figure 2:
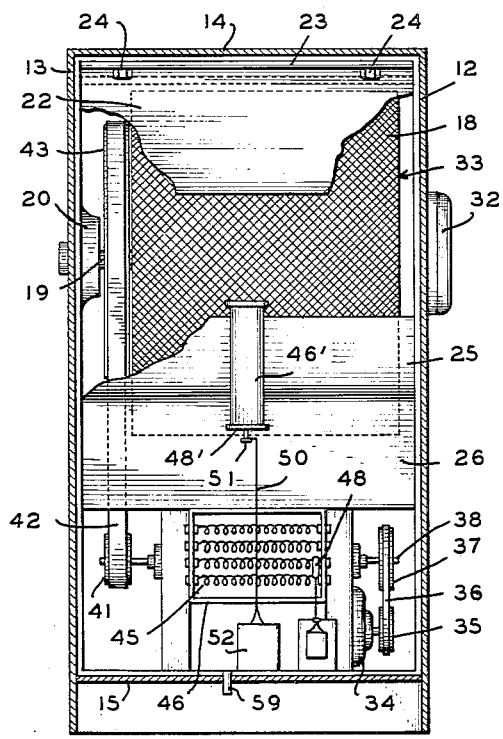

These and other objects of the invention will become apparent from the following description in conjunction with the accompanying drawing in which:

Fig. 1 is a vertical section through a device constructed in accordance with the present invention; and Fig. 2, a section transverse to the section of Fig. 1.

Referring to the drawing, the clothes drier includes a housing having side walls 10 and 11, front wall 12, back wall 13, top wall 14, and bottom wall 15. The side, front, and back walls project below the bottom wall so that the latter is supported in spaced relation from the floor.

In the upper part of the housing and spaced substantially intermediate the side walls a perforate receptacle or cage 18 is rotatably mounted on a shaft 19 which is supported by bearings 20 mounted on the rear wall 13. An arcuate shield or cover 22 is mounted by webs 23 and fastening elements 24 to the top wall of the housing and is positioned to cover a portion of the upper arcuate surface of the receptacle 18.

A similar cover or shield 25 is carried by webs 26 and covers a portion of the lower surface of the receptacle 18. The space 28 between the lower edge of the shield 23 and the upper end of the shield 25 and adjacent to the wall 10 is provided to admit air to the receptacle 18; similarly, the space 30 between the lower edge of the shield 25 defines an opening for the air to pass from the receptacle 18.

A door 32 is provided on the front wall 12 of the drier and extends into engagement with an opening 33 in the receptacle 18 through which the clothes are inserted and removed.

Mounted on the floor or bottom wall 15 an electric motor 34 drives a sheave 35 which by means of a belt 36 drives sheave 37. Sheave 37 drives shaft 38 which operates blower 39 mounted in housing 40 beneath the receptacle 18. Shaft 38 has another sheave 41 of smaller diameter which by means of belt 42 drives sheave 43 connected to shaft 19 which rotates the receptacle 18. The sheaves 35, 37, 41, and 43 are of selected diameters in order that the blower and receptacle may operate at the preferred speeds.

An electric resistance heating element 45 is mounted in a frame 46 at the discharge opening 47 of the blower 39. Thermostat 48 is positioned in the path of air from the blower and controls the flow of current to the heating element 45.

An ozonizer 46', which may be of the silent brush discharge type, is supported by brackets 47' on the side wall 10 of the housing and has a lower opening 48' through which air from the blower 39 enters and an upper opening 49 for the discharge of ozonized air. Although only a relatively small portion of the air discharging from the blower passes through the ozonizer sufficient ozone is imparted to the air to produce the desired result. It has been found that ozone in the range of .05–1.0% of the air is required to properly treat clothing in this manner, and apparatus of the type described is adapted to provide such amount of ozone.

Leads 50 from the terminals 51 of the ozonizer are connected to transformer 52 positioned on the bottom wall 15 of the housing, electric supply lines 53 from the transformer being connected to switch 54 on the front wall 11.

A humidistat 56 is mounted on the front wall of the housing in position to be responsive to the air leaving the receptacle through the opening 30. The humidistat may control the switch 54 to open a circuit to the motor 11, heater 45, and transformer 52, or to operate an indicator so that the user will be made aware of the completion of the treatment cycle.

Fresh air intake opening 58 is provided in the side wall 11 and eductor tube 59 is connected to the housing 40 of the blower 39 for discharging a fractional portion of the circulated air from the housing. As a result, during the treatment cycle, fresh air is constantly being admitted in order to assist in the proper conditioning of the clothing.

The switch 54 is of a conventional type and may have push buttons 60, 61 for manually initiating and stopping actuation of the various electrically operated elements, electric current being supplied thereto through cord 62.

In the operation of the device the clothing or other articles to be dried are placed in the receptacle 18 through the port 33 and the door is closed. Switch 54 is placed in operative position by action of push button 60 which closes electric circuits to motor 34, heating element 45, and transformer 52, all these being supplied by suitable electric connections (not shown) from the switch. The operation of the motor 34 drives blower 39 and rotates the receptacle 18 in which the clothing is placed.

Air within the housing is thus recirculated from the opening 28 through the receptacle, through the opening 30, and to the intake of the blower 39. From the blower 39 the air discharges and flows to the opening 28, a portion thereof passing through the ozonizer 46. Makeup air is drawn into the housing through opening 58 and compensated for by air discharged through the tube 59 from the blower housing 40. The circulated air is heated by the element 45 and ozonized the desired amount by the ozonizer 46.

The temperature of the circulating air is prevented from exceeding a predetermined degree by means of a thermostat 48 which controls the circuit from switch 54 to the element 45. When the clothing is dried to the desired state the humidistat 56 opens a circuit in the switch 54 in order to stop the operation of the motor, the heater and the ozonizer.

Through the employment of my invention, clothing is not only dried but subjected to fresh air and sufficient quantities of ozonized air so that substances remaining in the clothes after washing and which detract from the freshness and sterility thereof are removed, thus imparting to the clothing a conditioning more nearly like that resulting from outdoor drying in fresh air and sunshine.

It will be understood by those skilled in the art that the invention is not limited to the described embodiment but that reasonable variations and modifications are within its scope and therefore that the invention is only limited as found in the following claim.

What is claimed is:

A clothes drier and treatment device comprising a housing having a clothes inlet and withdrawal opening, a closure for said opening, a perforate receptacle for the clothing and rotatably mounted about a horizontal axis within the housing, an arcuate shield mounted over the upper portion of the receptacle, a second arcuate shield mounted around the lower portion of the receptacle, the ends of said arcuate shields being spaced apart a substantial distance opposite the axis of the receptacle to provide air inlet and outlet passages on opposite sides of said receptacle to permit the flow of air through the transverse axial portion of said receptacle, a blower mounted within said housing and beneath said receptacle for moving air transversely through the receptacle between the spaced apart ends of said arcuate shields, electric heating means positioned in said housing between the blower and the inlet passage, an ozonizer of tubular configuration mounted on a wall of said housing between said electric heating means and said inlet passage for imparting substantial quantities of ozone to the circulating heated air in said housing, an electric motor, drive means operated by said electric motor for operating said blower and for rotating said receptacle, switch means for connecting the motor, the heating means and the ozonizer to a source of current, a humidity sensitive element mounted in the path of the air leaving the receptacle, and a temperature responsive element mounted in the path of air leaving the electric heating means; said humidity sensitive element and temperature responsive element serving to interrupt the source of energy to said heating means, blower and ozonizer, whereby the clothes drier will stop when the clothes reach a predetermined temperature and a predetermined degree of dryness.

References Cited in the file of this patent

UNITED STATES PATENTS

| | | |
|---|---|---|
| 1,269,931 | Hintz | June 18, 1918 |
| 1,434,193 | Braley | Oct. 31, 1922 |
| 1,531,846 | Cutter | Mar. 31, 1925 |
| 2,403,630 | Blunk | July 9, 1946 |
| 2,406,494 | Ferris | Aug. 27, 1946 |